UNITED STATES PATENT OFFICE.

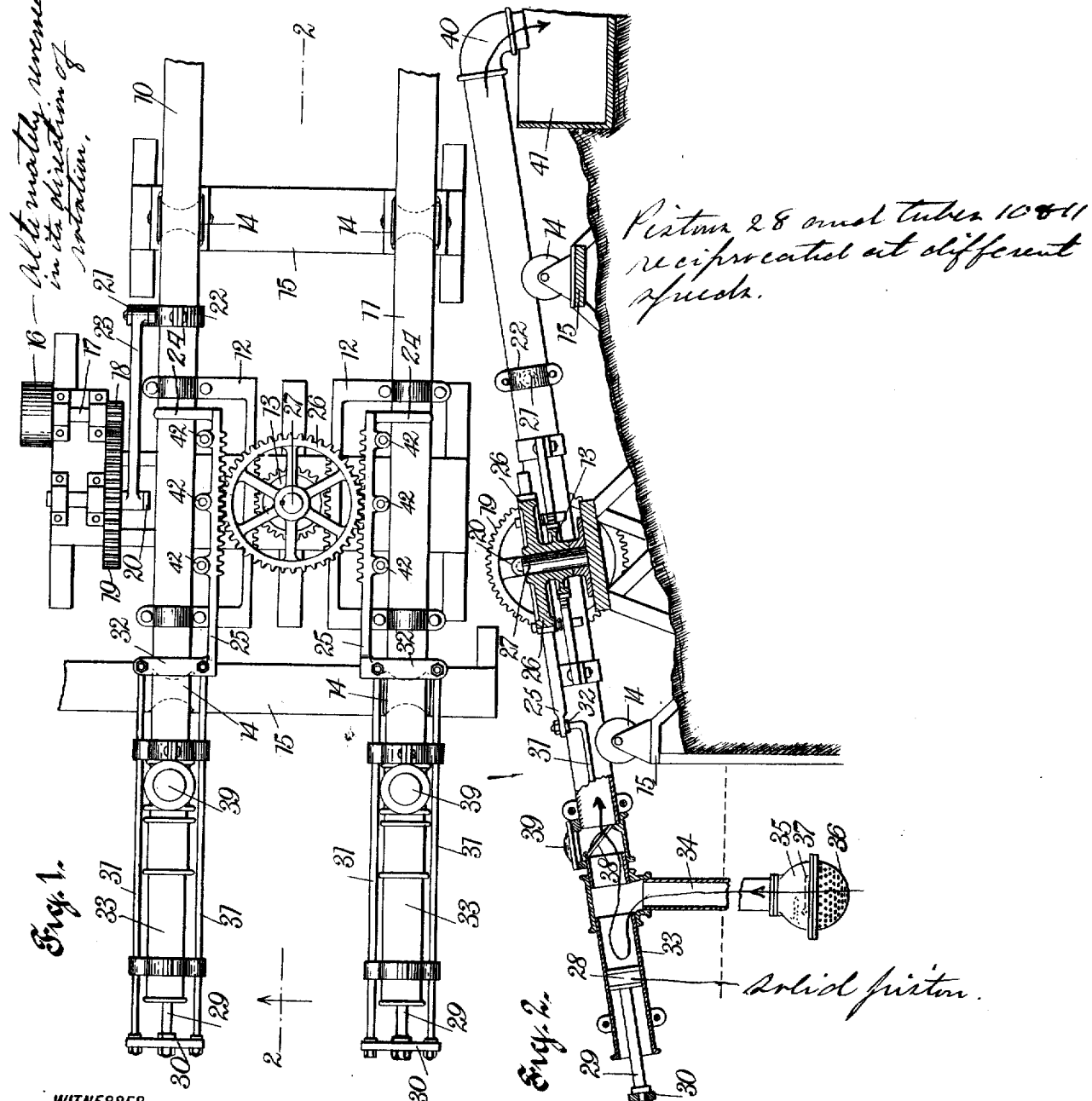

KARL F. GERHARD, OF HATTON, WASHINGTON.

PUMP.

1,006,843.

Specification of Letters Patent. Patented Oct. 24, 1911.

Application filed June 27, 1911. Serial No. 635,534.

*To all whom it may concern:*

Be it known that I, KARL F. GERHARD, a citizen of the United States, and a resident of Hatton, in the county of Adams and State of Washington, have invented a new and Improved Pump, of which the following is a full, clear, and exact description.

The principal object which the present invention has in view is to provide a pump having mutually balanced stand pipes of indefinite length, said stand pipes being each provided with pumping means for increasing the height of the column in each of said pipes, said means operated by the other of said pipes, thereby reducing the power needed for reciprocating the said pipes.

One embodiment of the present invention is disclosed in the structure illustrated in the accompanying drawings, in which like characters of reference denote corresponding parts in both views, and in which—

Figure 1 is a plan view of a pump constructed and arranged in accordance with the present invention; and Fig. 2 is a vertical longitudinal section taken on the line 2—2 in Fig. 1.

As shown in the accompanying drawings, two pipes 10 and 11 are operatively connected by rack bars 12, 12 and an intermediate connecting pinion 13. This arrangement serves to impart to the two rack bars movement in opposite direction, forming a transmission mechanism between the same. The pipes 10 and 11 are supported upon the grooved rollers 14. The rollers 14 are mounted on the framing sills 15.

The pipe 10 is reciprocated on the supporting rollers 14 by any suitable form of motive power. As shown in the drawings, the prime mover is connected by means of a belt to the driven pulley 16. The pulley 16 is mounted on the shaft 17, at the opposite end whereof is provided a pinion 18. The pinion 18 is meshed with a large gear wheel 19. Set out from the gear wheel 19 is a crank pin 20, which pin is operatively connected to a crank pin 21 set out from the clamping ring 22 by a pitman 23.

When the pulley 16 is driven it will be seen that the transmission mechanism embodying the pitman 23 operates to reciprocate the pipe 10. It will further be understood that as the pipe 10 is reciprocated the pipe 11 is likewise reciprocated, but in a direction opposite the movement of the pipe 10. This counter-movement of the two pipes operates to balance the same on the transmission mechanism, the racks 12, 12 and the pinion 13.

Slidably mounted on each of the pipes by means of collars 24 are the rack bars 25. Each bar 25 is suitably provided with a gear toothed section, the teeth whereof are meshed with the teeth of the large gear wheel 26. The gear wheel 26 is fixedly mounted on the shaft 27, to which the pinion 13 is likewise fixedly attached. The pinion 13 and the gear wheel 26 differentiate in diameter to vary the relative peripheral speed of the said pinion and wheel. The object in thus varying the speeds of the periphery of the pinion and wheel is to accelerate the speed of the rack bars 25 over the speed of the pipes 10 and 11 with which said rack bars are connected.

The rack bars 25 are connected with a piston 28 in each of the pipes 10 and 11. The pistons 28 are provided with the piston rods 29 which are mounted in the cross heads 30. The cross heads 30 are connected by means of the operating rods 31 with a cross head 32, one of which cross heads is provided on each of the rack bars 25. Thus, as each of the pipes 10 or 11 is extended in a downward direction, the wheel 26 operates to thrust the cross heads 32 and 30 and the pistons 28 connected therewith farther than the travel of the descending pipe. This action ultimates in the movement of the piston 28 lengthwise the said pipe, and forms a suction in the pump sections 33 wherein the said pistons are mounted.

The pump sections 33 are each connected with inlet pipes 34, at the lower end whereof is provided a globular-shaped casing 35. The casing 35 is provided with a lower perforated section 36. Between the lower section 36 and the upper section of the casing 35 is a clapper valve 37 which lifts to permit the inflow of water through the said casing and closes to prevent the exit downward therefrom. The water is thus trapped in the pipe 34 and pump sections 33. To aid the suction action of the pump sections 33 a gate valve 38 is provided in each of the said pipes. The valves 38, for convenience of construction, are pivotally mounted directly below a removable hand-hold cover 39, as seen best in Fig. 2 of the drawings.

The pipes 10 and 11 are mounted on the rollers 14, and are inclined as shown in

Fig. 2 of the drawings, whereby the weight of each of the pipes assists in the elevation of the opposite pipe when it in turn is depressed or permitted to roll down the incline. As explained, the downward extension of each of the pipes results in the intake through the pipe 34 of the water in which the casing 35 is immersed. When the operation of the driving mechanism is reversed the movement of the pipes 10 and 11 is reversed. As each pipe is lifted on its incline the rack bars 25 are moved upward at an accelerated speed the reverse of that above described with reference to the movement of the said rack bar in the depressing or outward position. This movement of the rack bars 25 results in the thrust of the piston 28 toward the delivery end of the pipes 10 or 11, as the case may be, and thereby forces the water contained in the said pipe through the valve 38 into the upper or delivery section of the said pipe. Adding to the water at the bottom of the pipes 10 and 11 causes the outward flow at the delivery end 40 of each of the said pipes. The water delivered from the pipes, as shown in the drawings, is received in a tank 41, or other suitable receptacle.

The mechanism for alternately reversing the pulley 16 and driving mechanism connected therewith is not shown in the drawings.

To facilitate the reciprocation of the pistons 28 and 29 the rack bars 25, 25 are provided with wearing rollers 42 which bear against the side of the pipes 10 and 11.

Having thus described my invention, what I claim as new and desire to secure by Letters Patent is:—

1. In a pump of the character described, a plurality of delivery pipes; a plurality of roller supports for said pipes disposed to maintain the same in inclined position; a reciprocating piston mounted in each of said pipes; and a transmission mechanism connecting said pipes embodying a plurality of gear wheels of different diameters mounted on the same shaft, the smaller of said gear wheels being operatively connected with said pipes and the larger of said gear wheels being operatively connected with said pistons.

2. In a pump of the character described, a pipe reciprocatively mounted having a rack bar extended therefrom; a piston mounted at the receiving end of said pipe having a reciprocating mechanism connected therewith and embodying a rack bar disposed adjacent the rack bar on said pipe; and a driving mechanism for said pipe and said piston embodying a shaft and gear wheels meshed with said rack bars, said gear wheels being of unequal diameter to produce varied peripheral speeds, the larger of said gear wheels being connected with the rack bar of said piston.

In testimony whereof I have signed my name to this specification in the presence of two subscribing witnesses.

KARL F. GERHARD.

Witnesses:
ALFRED V. MARION,
E. A. EDWARDS.

Copies of this patent may be obtained for five cents each, by addressing the "Commissioner of Patents, Washington, D. C."